(12) United States Patent
Gottschaldt

(10) Patent No.: US 9,352,429 B2
(45) Date of Patent: May 31, 2016

(54) HANDHELD PRESSING TOOL

(75) Inventor: Gunnar Gottschaldt, Grevenbroich (DE)

(73) Assignee: Novopress GmbH Pressen Und Presswerkzeuge & Co. KG, Neuss (DE)

( * ) Notice: Subject to any disclaimer, the term of this patent is extended or adjusted under 35 U.S.C. 154(b) by 88 days.

(21) Appl. No.: 14/232,972

(22) PCT Filed: Jun. 27, 2012

(86) PCT No.: PCT/EP2012/062401
§ 371 (c)(1),
(2), (4) Date: Jan. 15, 2014

(87) PCT Pub. No.: WO2013/010762
PCT Pub. Date: Jan. 24, 2013

(65) Prior Publication Data
US 2014/0223714 A1    Aug. 14, 2014

(30) Foreign Application Priority Data

Jul. 21, 2011   (DE) .................... 20 2011 103 530 U

(51) Int. Cl.
*B23P 19/04* (2006.01)
*B21D 39/04* (2006.01)
*B25B 27/10* (2006.01)

(52) U.S. Cl.
CPC ............... *B23P 19/04* (2013.01); *B21D 39/048* (2013.01); *B25B 27/10* (2013.01); *Y10T 29/53996* (2015.01)

(58) Field of Classification Search
CPC .. B21D 39/048; B25B 27/026; B25B 27/146; B25B 27/10; Y10T 29/53996; Y10T 29/49913
USPC ....................................................... 72/453.01
See application file for complete search history.

(56) References Cited

U.S. PATENT DOCUMENTS

| 2003/0126905 A1* | 7/2003 | Frenken ..................... 72/453.16 |
| 2007/0214859 A1* | 9/2007 | Bowles et al. .................. 72/412 |
| 2008/0087144 A1* | 4/2008 | Rollins et al. .................. 81/301 |
| 2009/0133591 A1 | 5/2009 | Frenken |

(Continued)

FOREIGN PATENT DOCUMENTS

| DE | 20202200 U1 | 6/2003 |
| DE | 102006003044 A1 | 7/2007 |

(Continued)

OTHER PUBLICATIONS

International Search Report dated Nov. 5, 2012 for PCT/EP2012/062401.

*Primary Examiner* — Joseph J Hail
*Assistant Examiner* — Henry Hong
(74) *Attorney, Agent, or Firm* — Ohlandt, Greeley, Ruggiero & Perle, LLP

(57) ABSTRACT

A handheld pressing tool, which is suitable in particular for crimping press fittings and/or cable lugs, has at least two pressing elements which can move in relation to one another. These can be closed by a hydraulically operated piston element. To this end, the piston element is connected to at least one actuation element for moving at least one of the pressing elements. When the piston element is being returned to a short-stroke starting position, a brake element acts on the piston element and/or the actuation element.

10 Claims, 4 Drawing Sheets

(56) References Cited

U.S. PATENT DOCUMENTS

| | | | |
|---|---|---|---|
| 2010/0275672 A1* | 11/2010 | Frenken | 72/372 |
| 2010/0300308 A1 | 12/2010 | Frenken | |
| 2011/0113851 A1* | 5/2011 | Frenken | 72/416 |
| 2011/0219594 A1* | 9/2011 | Kaufmann | 29/237 |

FOREIGN PATENT DOCUMENTS

| | | |
|---|---|---|
| DE | 102006026552 A1 | 12/2007 |
| DE | 102008024018 A1 | 11/2008 |
| EP | 1319475 A2 | 6/2003 |
| WO | 2013010762 A1 | 1/2013 |

* cited by examiner

HANDHELD PRESSING TOOL

BACKGROUND

1. Field of the Disclosure

The disclosure refers to a handheld pressing tool that is suited in particular for the crimping of press fittings or cable lugs.

2. Discussion of the Background Art

Handheld pressing tools comprise an electro-hydraulic drive for example. Here, an electromotive drive means operates a hydraulic pump that moves a piston element. The piston element is connected with an actuating element such as a roller head. To close at least two pressing elements that are movable with respect to each other, i.e. to effect crimping, the actuating element acts upon at least one of the pressing elements. With tongs-shaped pressing elements, two pressing elements are pivotably provided on the handheld pressing tool, the actuating element, which in particular comprises a roller head, acting on both pivoting arms of the pressing elements. The displacement of the piston element, and thus of the roller head, in the longitudinal direction causes the two pivoting arms to be pushed apart. Since the two pressing elements are pivotable about a pivot axis, pushing the pivoting arms apart causes the closing of the ends of the pressing elements carrying or forming the pressing jaws. Depending on the stroke length of the piston element, handheld pressing tools are respectively suited for different pressing elements, with the pressing elements being moved over a longer pressing distance if the stroke is large. This is the case, for example, when such pressing elements are used to crimp press fittings with a large outer diameter. It is necessary in this case to open the two tongs-like pressing elements wide in order to place them around the press fitting having a large outer diameter. When such handheld pressing tools with a small stroke are also used for press fittings with a smaller outer diameter, for example, this has the consequence that the press fitting is crimped only in the last part of the pressing stroke. Thus, there is a large idle stroke. This has the disadvantage that a relatively long crimping time is required for the crimping.

To allow the use of a handheld pressing tool to perform crimping both with a required large stroke and with a required short stroke by means of different pressing elements, a pressing tool with an adjustable stop is known from DE 10 2006 003 044. For this purpose, the pressing tool described in DE 10 2006 003 044 has a stop displaceable in the longitudinal direction of the piston element. The same can be positioned by the user in different end positions. Prior to a crimping operation, the user thus has to displace the end stop manually in the longitudinal direction for adjustment. This has the disadvantage that the user has to decide prior to each crimping operation, what stroke the pressing device is operated with. This represents a considerable effort and bears the risk of erroneous operations.

It is an object of the disclosure to provide a handheld pressing tool with which different crimping strokes can be realized in a simple manner, depending on the pressing elements used in the pressing tool.

SUMMARY

The handheld pressing tool of the disclosure, which is in particular suited for the crimping of press fittings and cable lugs, comprises at least two pressing elements movable relative to each other. The pressing elements carry the pressing jaws or are formed integrally with the pressing jaws. Preferably, the pressing elements are two tongs-like elements which are connected with a housing of the handheld pressing tool via an in particular common pivot axis. A hydraulically operated piston element is provided for moving at least one of the two pressing elements. In order to drive, i.e. to move, the piston element in the longitudinal direction to perform a crimping operation the piston element may be actuated through a hydraulic pump that is driven by an electric motor, for example. When the crimping is accomplished, the piston element is returned to the starting position by moving the pressing jaws of the pressing element apart.

At the end directed towards the pressing elements, the piston element has at least one actuating element for moving at least one of the pressing elements. According to the disclosure a brake element is provided that acts upon the piston element and/or the actuating element when the piston element is returned. According to the disclosure the brake element is designed such that the piston element is first returned to a short-stroke starting position. This is a starting position from which the piston element performs only a relatively short stroke to close the pressing elements. When the handheld pressing tool is used in the short-stroke starting position, it is used, for example, to crimp press fittings with relatively small diameters.

In a preferred inventive development of the handheld pressing tool the brake element can be overcome in order to return the piston element to a long-stroke starting position. This is possible in particular, because, when corresponding pressing elements are used that require a long stroke, the pressing jaws of the press elements are pushed further apart, in particular manually. According to the disclosure, the piston element is then automatically pushed back to the long-stroke starting position. According to the disclosure, this is particularly advantageous, since the spreading or opening of the pressing jaws, which is indispensible in the preparation of a crimping process, automatically causes the piston element to be pushed back to the long-stroke starting position. According to the disclosure, it is not required in this context to make any adjustment to the pressing tool. In particular, no stop needs to be adjusted. Thus, the operation of the pressing tool is simplified and erroneous operations are avoided.

Preferably, the brake element exerts a braking force on the piston element and/or the actuating element. A retaining element may be provided for this purpose, the retaining element preferably being spring-loaded. In this context it is possible to provide a separate spring, such as a coil spring, cooperating with the retaining element and/or to design the retaining element so as to be resilient or to connect it resiliently with a housing of the handheld pressing tool. Due to the provision of such a retaining element, it is possible to return the piston element to the long-stroke starting position in a simple manner, since the brake element is overcome by simply opening the pressing elements. In particular, the retaining element is compressible and/or radially displaceable for the purpose of returning the piston element to the long-stroke starting position. For example, the retaining element is pushed back into the housing of the handheld pressing tool in order to overcome the braking force. This may be done in particular by means of the pivoting arms of the pressing elements.

Preferably, the actuating element comprises a roller head. Especially, when two pressing elements are provided, it is preferred that the roller head has two rollers, each of the rollers respectively acting on one of the pressing elements, specifically on the respective pivoting arm of the pressing elements. Thus, a displacement of the piston element in the longitudinal direction thus causes the two pivoting arms to be pushed apart via the rollers that contact the pivoting arms. Owing to the fact that they are supported by a pivot axis connected with the housing of the pressing tool, the in particular opposite pivoting arms cause the pressing jaws to be pressed together. Here, it is particularly preferred that the pivoting arms have convexly curved opposite flanks.

Preferably, the actuating element, and thus the piston element, is returned by opening the pressing elements, wherein the return to the short-stroke starting position is assisted by a spring element or is exclusively performed by a spring element. The brake is always overcome by opening the pressing elements still farther so that the actuating element and the piston element are automatically returned to the long-stroke starting position, whereby the braking force exerted by the braking element is overcome.

The following is a detailed description of the disclosure with reference to a preferred embodiment and to the accompanying drawings.

DETAILED DESCRIPTION OF THE PREFERRED EMBODIMENT

Figure 1:
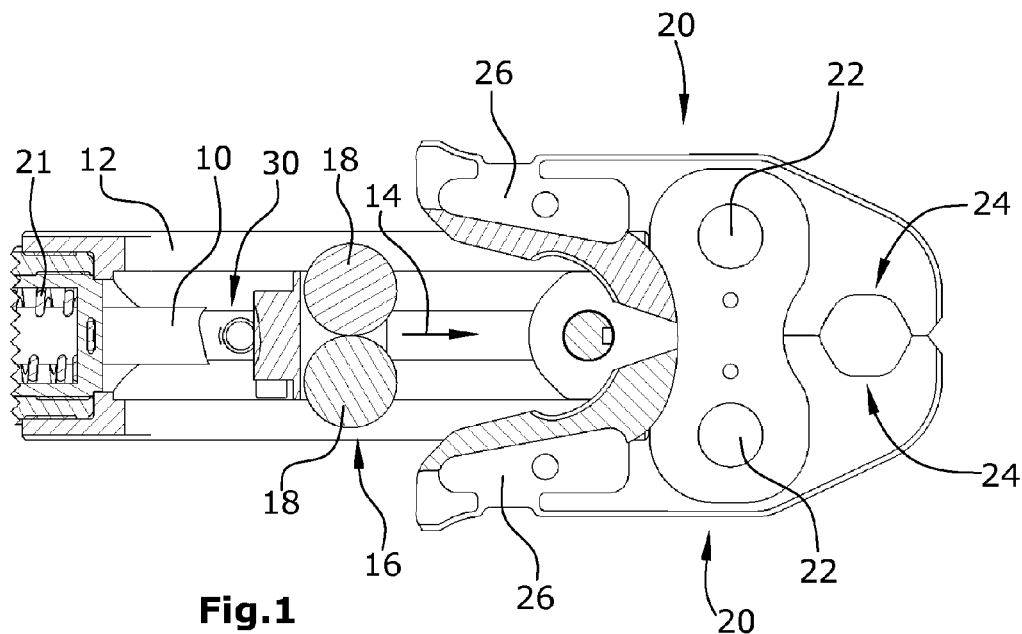
FIG. 1 is a schematic partly sectional side elevational view of a part of a pressing tool in a closed position, with pressing elements arranged therein that require a short pressing stroke.

The Figures each illustrate only the front part of the pressing tool which is relevant to the disclosure and which holds the pressing elements.

A piston element 10 is arranged in a housing 12 of the handheld pressing tool and is displaced in the longitudinal direction 14 by a hydraulic pump not illustrated in detail. The hydraulic pump is operated by an electromotive drive device which also not illustrated herein. The piston element 10 is connected with an actuating element which in the embodiment illustrated comprises a roller head 16. The roller head 16 comprises two rollers 18 that are illustrated in section in FIG. 1.

Further, two pressing elements 20 are pivotably supported in the housing 12 by a respective pivot axis 22. The pressing elements 20 illustrated in FIG. 1 are pressing elements that can be operated with a short stroke. Each of the two pressing elements 22 is formed integrally with pressing jaws 24, which pressing jaws 24 serving to crimp a press fitting, for example.

After the crimping of a press fitting or the like, the pressing elements 20 are in the closed position illustrated in FIG. 1. In this state the crimping is terminated. In FIG. 1, the piston element is also already pushed back to the short-stroke starting position. In the embodiment illustrated herein, this is effected by means of a spring 21 which urges the piston element 10, together with the actuating element 16, back to the short-stroke starting position. Thereby, the hydraulic liquid is pressed back into a hydraulic reservoir, for example. For a displacement of the piston elements 10 in the longitudinal direction 14, the hydraulic liquid is supplied from the hydraulic reservoir by means of the hydraulic pump not illustrated herein.

To perform a new crimping operation using the pressing elements 20 requiring a short stroke, the pressing elements 20 are opened manually. This is done by pushing the two pressing jaws 24 apart or by pressing pivoting levers 26 of the two pressing elements 20 together. Thereby, the pressing elements 20 are moved to the starting position illustrated in FIG. 2. For the next crimping operation and thus for the closure of the two pressing elements 20, the piston element 10 is again displaced in the direction of the arrow 14 by means of the hydraulic pump. Thus, the two rollers 18 of the roller head 16 come to contact the two flanks 28 of the pivoting arms 26 and push the pivoting arms 26 apart. Thereby, the two pressing elements 20 are pivoted about the pivoting axis 22 and the pressing jaws 24 are closed.

Figure 2:
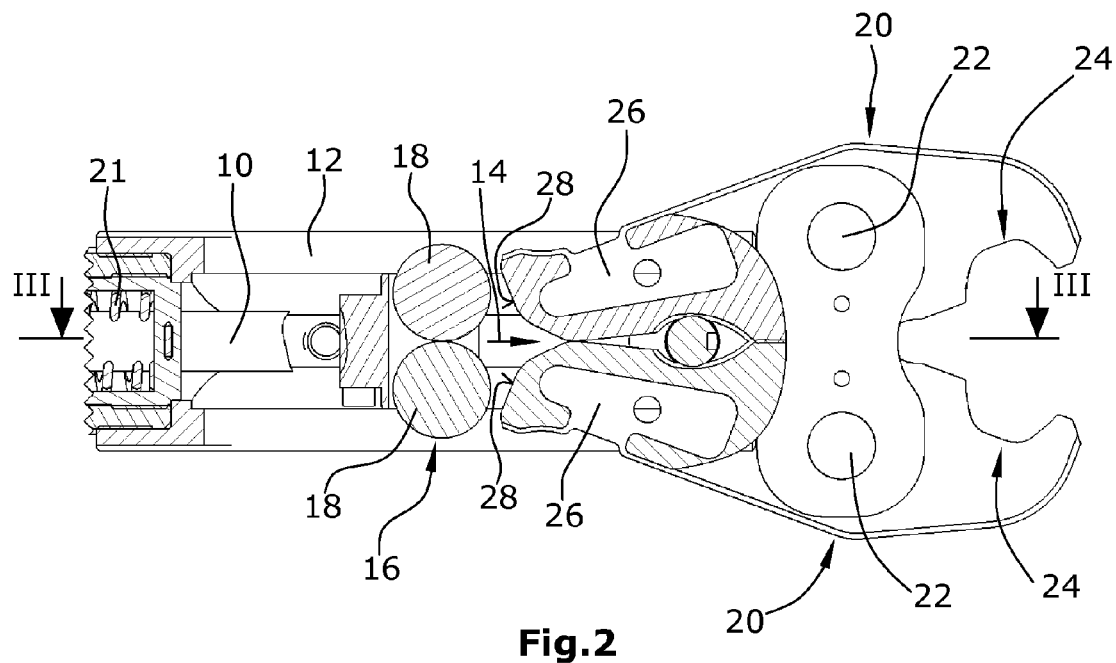
FIG. 2 shows the pressing tool illustrated in FIG. 1, with the pressing elements opened.
Figure 3:
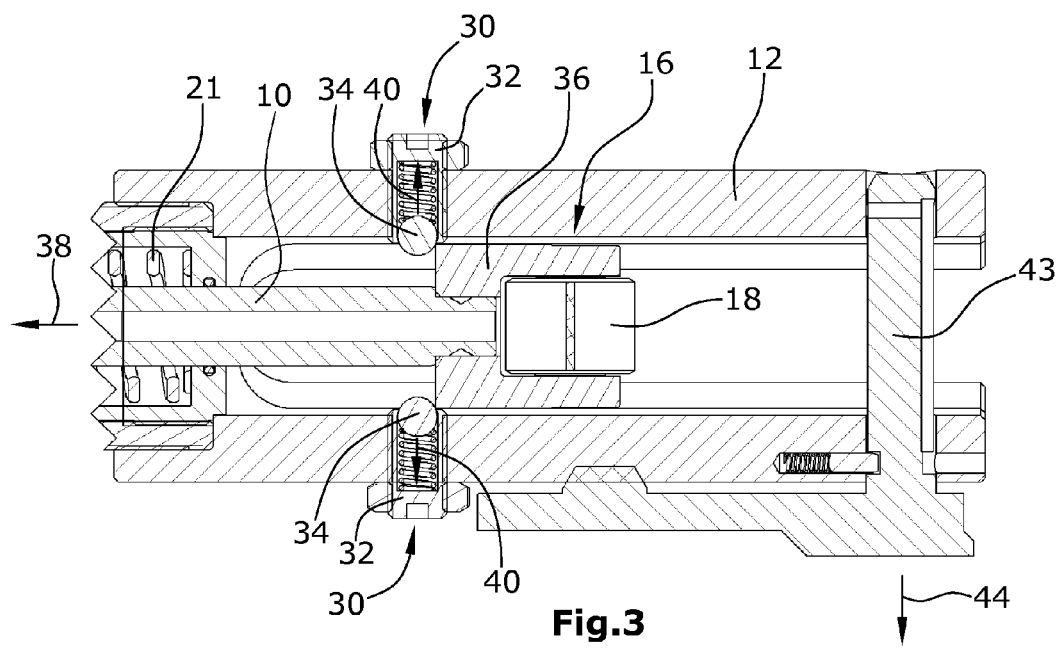
FIG. 3 shows a schematic cross section of the pressing tool along line III-III in FIG. 2, with no pressing elements being illustrated.

Owing to the provision of a brake element 30 (FIG. 3), the pushing back of the piston element 10, which in the embodiment illustrated in FIGS. 1 to 3 is effected by a spring 21, occurs only up to a short-stroke starting position. For this purpose, the brake element 30 comprises a retaining element 32. The retaining element 32 comprises a spring-loaded ball 34. The latter acts on a support element 36 of the roller head 16 such that the roller head 16, and thus the piston element 10 connected with the roller head 16, is slowed down in the short-stroke starting position illustrated in FIG. 3.

In particular for the purpose of avoiding a canting of the roller head 16, two opposite brake elements 30 are provided in the embodiment illustrated. The two brake elements 30 are identical in design.

To be able to cause the piston element 10, together with the roller head 16, farther backwards in the direction of the arrow 38, the two retaining elements 32 are each movable in the direction of the arrow 40 or can be pushed into the housing 12. The movement in the direction of the arrows 40 occurs in particular against a spring force, while it is also possible that the movement is effected by an elastic deformation of the retaining elements 32.

Figure 4A:
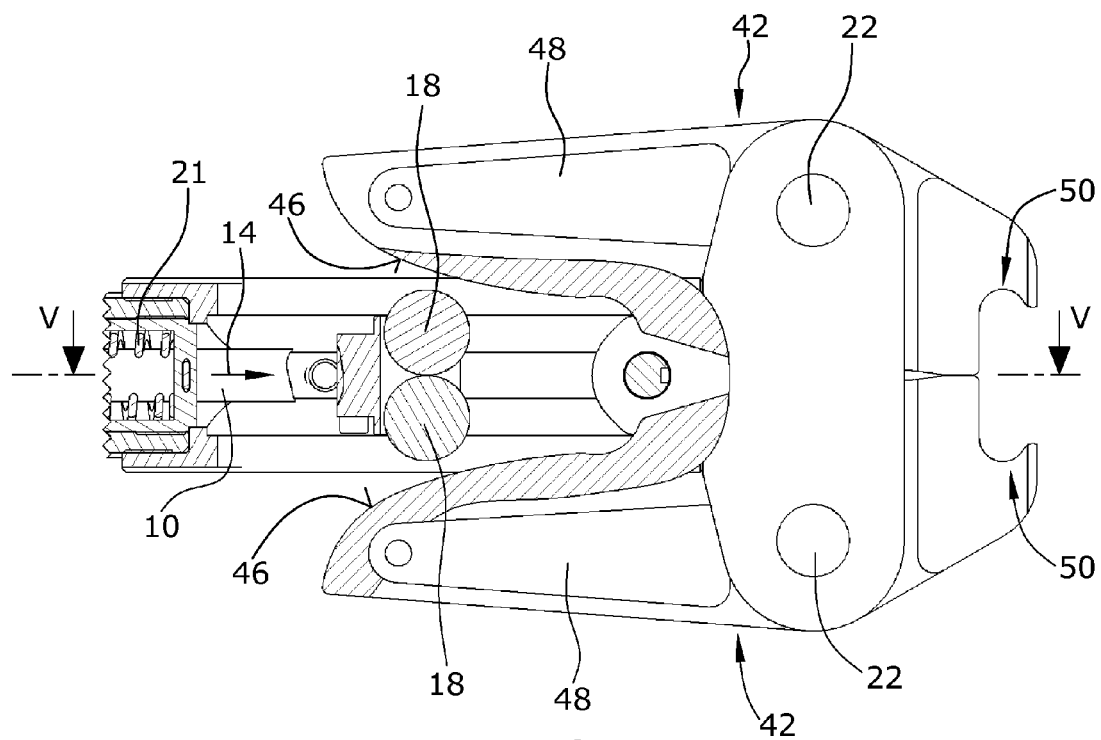
FIG. 4 is a schematical longitudinal section of the pressing tool corresponding to the view in FIG. 2, with pressing elements being provided that require a long pressing stroke.
Figure 4B:
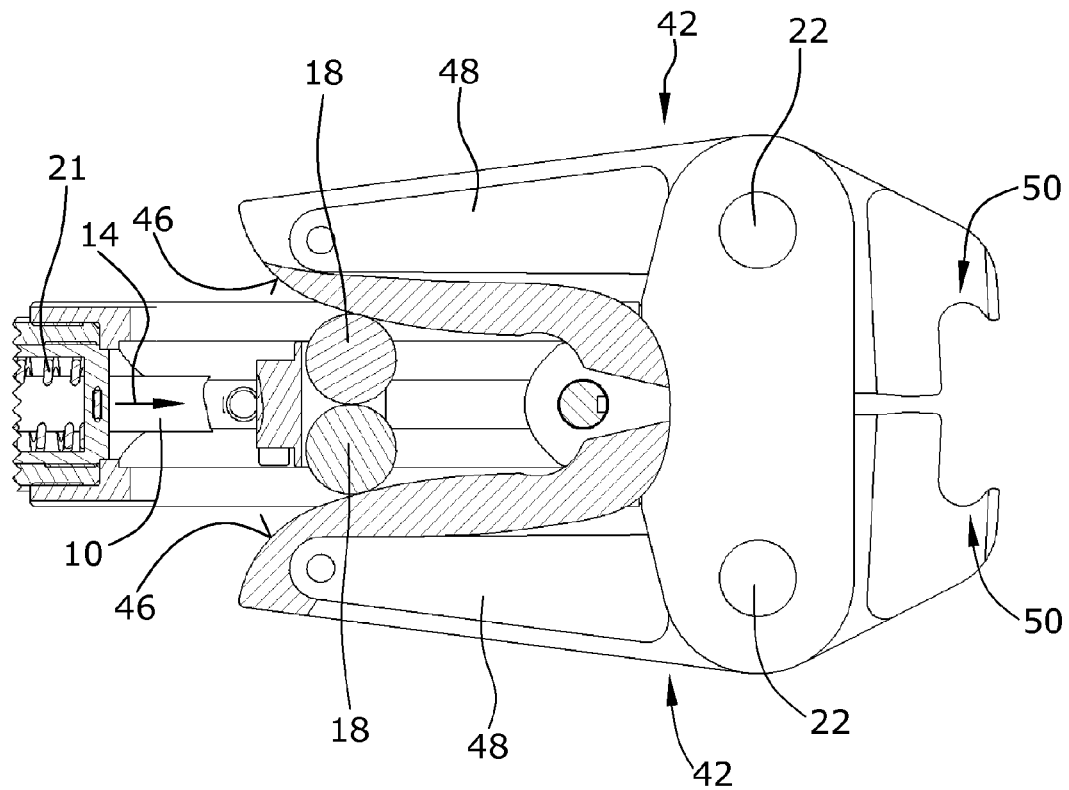

Such an overcoming of the braking effect of the brake elements 30 is necessary and suitable to allow the mounting of pressing elements 42 (FIGS. 4a to 4c) into the pressing tool that require a longer stroke.

Figure 4C:
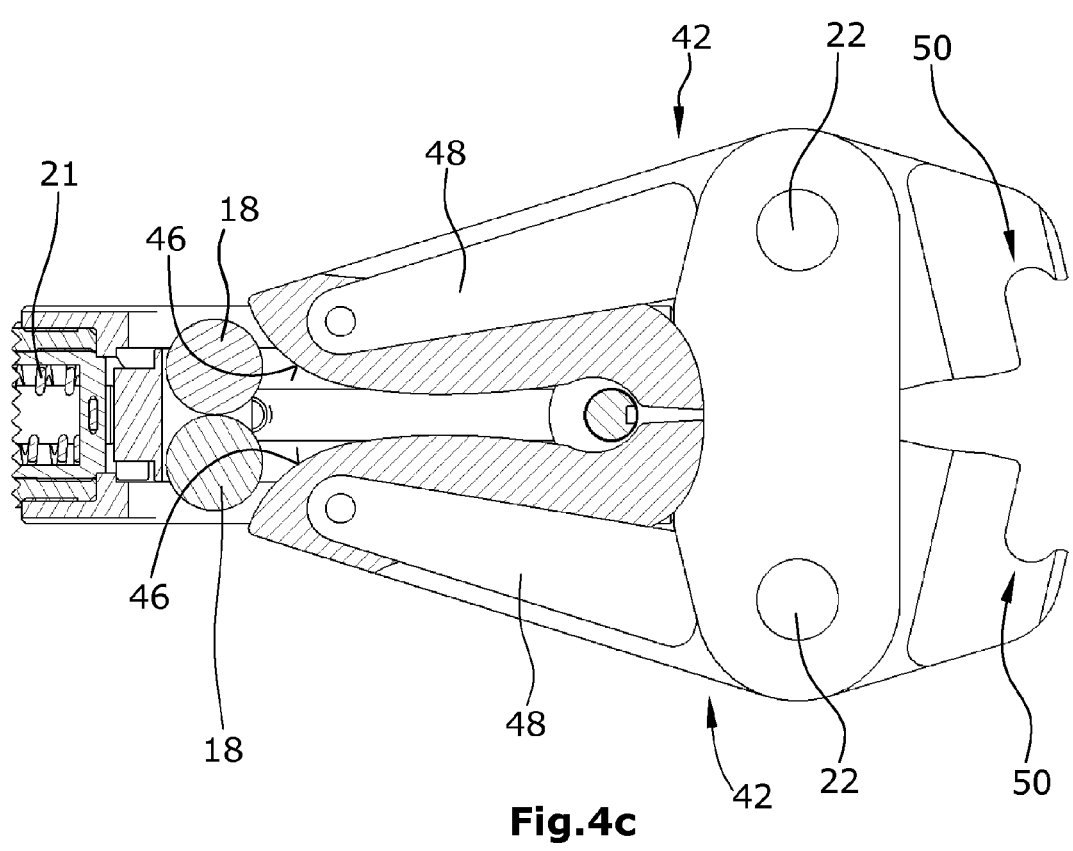

Pressing elements 42 with a long stroke (FIG. 4a) are used as the pressing tool, with the pressing tool still being in the position for short-stroke pressing elements and, thus, the brake element 30 still acts on the actuating element 16. By opening the pressing elements 42, the two flanks 46 of the pivoting levers 26 come to contact the two rollers 18 of the roller head 16 (FIG. 4b), with the braking force of the brake element 30 being overcome by opening the pressing elements further (FIG. 4c). After the braking force of the brake element 30 has been overcome, the spring 21 thus causes the piston element 10, together with the actuating element 16, to be fully withdrawn to the long-stroke position.

Replacing the pressing elements 20 with the pressing elements 42 is done by retracting a locking element 43 (FIG. 3) in the direction of the arrow 44. Thereafter, the pressing elements 20 can be removed from the pressing tool and the pressing elements 42 can be inserted into the pressing tool. The insertion of the pressing elements 42 causes flanks 46 of the two pivoting arms 48 of the pressing elements 42 to press on the rollers 18 so that these are pushed back further in the direction of the arrow 38 (FIG. 3) against the action of the two brake elements 30. Thus, in FIG. 4c, the roller head 16 and the piston element 10 are in the long-stroke starting position. To close the pressing jaws 50 of the pressing elements 42, the piston element 10 is again displaced in the direction of the arrow 14 by operating the hydraulic pump.

Figure 5:
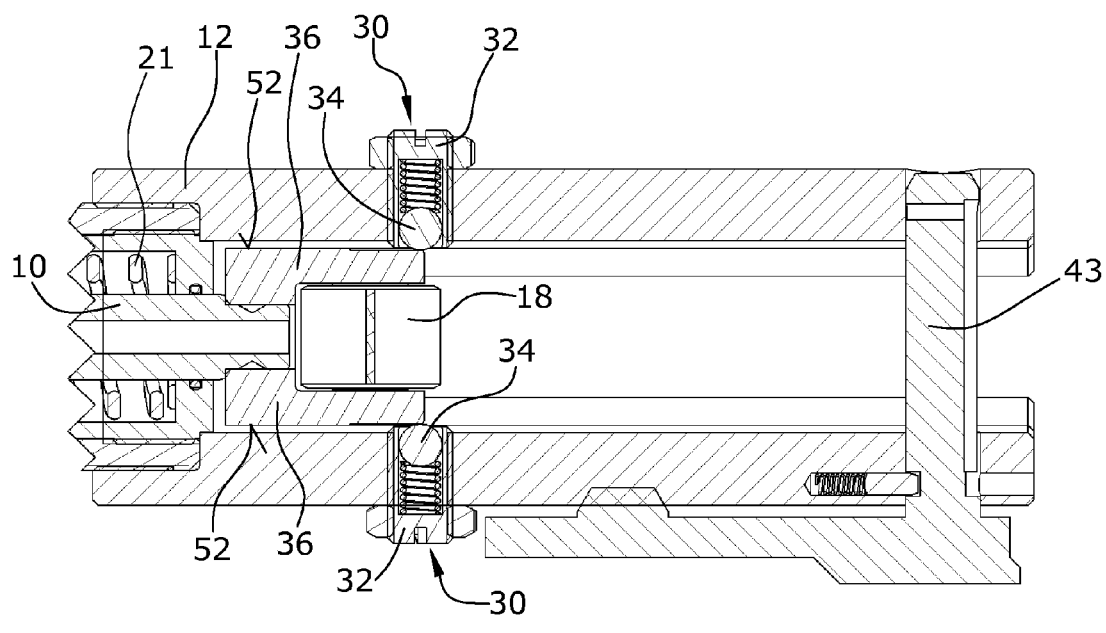
FIG. 5 is a schematic cross section of the pressing tool along line IV-IV in FIG. 4, with no pressing elements being illustrated.

As can be seen in particular in FIG. 5, the retaining elements 32 of the brake elements 30 are in a retracted position and, as such, respectively contact an outer face 52 of the support element 36.

In an alternative embodiment of the brake elements 30, these are arranged completely inside the housing 12. The brake elements also comprise retaining elements 58 loaded by a spring 60, the spring 60 exerting a force acting inward in the direction of the piston element 10. The retaining elements 58 are pushed back against the force of the springs 60.

What is claimed is:

1. A handheld pressing tool for crimping press fittings and/or cable lugs, the pressing tool comprising:
    at least two interchangeable sets of pressing elements movably disposable towards and away from each other, wherein movement towards each other effects the crimping, wherein a first interchangeable set of the pressing elements is for a short-stroke, wherein each pressing element for the short stroke has a first surface having a first length, wherein a second interchangeable set of the pressing elements is for a long-stroke, wherein each pressing element for the long stroke has a first surface having a second length, and wherein the second length is greater than the first length;
    a hydraulically operated piston element longitudinally moveable from a starting position to an ending position in the short-stroke and the long-stroke, wherein in the starting position for the short-stroke and the long-stroke the at least two pressing elements are disposed away from each other, and wherein in the ending position for the short-stroke and the long-stroke the at least two pressing elements are disposed towards each other;
    at least one actuating element disposed between the at least two pressing elements and the piston element, wherein movement of the piston element from the starting position to the ending position causes the at least one actuating element to move in a first longitudinal direction to act on the first surface of at least one of the at least two pressing elements for the short-stroke or for the long-stroke to move the pressing elements towards each other to the ending position, and wherein movement of the first surface of at least one of the pressing elements for the short-stroke or for the long-stroke to the starting position as the pressing elements move away from each other causes the actuating element to move in a second opposite longitudinal direction; and
    a brake element configured to apply a braking force on the piston element and/or the actuating element as the pressing elements move away from each other to the starting position, wherein the first length is insufficient to overcome the braking force, and wherein the second length is sufficient to overcome the braking force.

2. The handheld pressing tool of claim 1, wherein the brake element comprises at least one moveable retaining element that exert the braking force on the piston element and/or the actuating element, wherein the retaining element is moveable against a spring force, by elastic deformation or a combination thereof.

3. The handheld pressing tool of claim 2, wherein the movement of the at least one retaining element allows the piston element to return to the long-stroke starting position.

4. The handheld pressing tool of claim 2, wherein the at least one retaining element comprises two retaining elements disposed opposite each other in the pressing tool.

5. The handheld pressing tool of claim 1, wherein the actuating element comprises a roller head.

6. The handheld pressing tool of claim 5, wherein the roller head comprises two rollers.

7. The handheld pressing tool of claim 1, comprising two pressing elements, wherein the actuating element acts on the first surface of a pivoting arm of each of the two pressing elements, and wherein the pivoting arms of the two pressing elements are pivotably movable toward and away from each other.

8. The handheld pressing tool of claim 7, wherein the first surface of the pivoting arm of each pressing element comprises a convexly curved flank disposed opposite to each other.

9. The handheld pressing tool of claim 7, wherein the actuating element is returned to either the short-stroke or long-stroke starting position by the at least one pivoting arm.

10. The handheld pressing tool of claim 1, wherein the actuating element comprises a roller head.

* * * * *